US009797981B2

(12) United States Patent
Yamaguchi et al.

(10) Patent No.: US 9,797,981 B2
(45) Date of Patent: Oct. 24, 2017

(54) MOVING-OBJECT POSITION/ATTITUDE ESTIMATION APPARATUS AND MOVING-OBJECT POSITION/ATTITUDE ESTIMATION METHOD (71) Applicant: NISSAN MOTOR CO., LTD., Kanagawa (JP)

(72) Inventors: Ichiro Yamaguchi, Sagamihara (JP); Naoki Kojo, Inagi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 433 days.

(21) Appl. No.: 14/383,012

(22) PCT Filed: Feb. 28, 2013

(86) PCT No.: PCT/JP2013/055470
§ 371 (c)(1),
(2) Date: Sep. 4, 2014

(87) PCT Pub. No.: WO2013/133129
PCT Pub. Date: Sep. 12, 2013

(65) Prior Publication Data
US 2015/0015702 A1    Jan. 15, 2015

(30) Foreign Application Priority Data

Mar. 6, 2012  (JP) .................................. 2012-049372

(51) Int. Cl.
G01S 3/786       (2006.01)
G06T 7/73        (2017.01)
(Continued)

(52) U.S. Cl.
CPC ........ *G01S 3/7864* (2013.01); *G06K 9/00791* (2013.01); *G06T 7/74* (2017.01);
(Continued)

(58) Field of Classification Search
CPC .............. G01S 3/7864; G06K 9/00791; G06K 2009/2045; G06T 7/0044; G06T 17/05;
(Continued)

(56) References Cited

U.S. PATENT DOCUMENTS 5,072,396 A * 12/1991 Fitzpatrick ............... G09B 9/24
                                                              348/116
5,422,828 A *  6/1995 Choate .................... G01S 11/12
                                                              342/458
(Continued)

FOREIGN PATENT DOCUMENTS

JP    2009-199572 A    9/2009
WO    2012133371 A1   10/2012

*Primary Examiner* — Jay Patel
*Assistant Examiner* — Marnie Matt
(74) *Attorney, Agent, or Firm* — Young Basile Hanlon & MacFarlane, P.C.

(57) ABSTRACT

A moving-object position/attitude estimation apparatus includes: an image-capturing unit configured to acquire a captured image; a comparative image acquiring unit configured to acquire a comparative image viewed from a predetermined position at a predetermined attitude angle; a likelihood setting unit configured to compare the captured image with the comparative image and to assigns a high attitude angle likelihood to the comparative image and to assigns a high position likelihood to the comparative image; a moving-object position/attitude estimation unit configured to estimate the attitude angle of the moving object based on the attitude angle of the comparative image assigned the high attitude angle likelihood and to estimate the position of the moving object based on the position of the comparative image assigned the high position likelihood.

8 Claims, 6 Drawing Sheets (51) Int. Cl.
*G06K 9/00* (2006.01)
*G06T 17/05* (2011.01)
*H04N 7/18* (2006.01)
*G06K 9/20* (2006.01)

(52) U.S. Cl.
CPC ............. *G06T 17/05* (2013.01); *H04N 7/181* (2013.01); *G06K 2009/2045* (2013.01); *G06T 2207/30244* (2013.01); *G06T 2207/30252* (2013.01); *H04N 7/18* (2013.01)

(58) Field of Classification Search
CPC . G06T 2207/30244; G06T 2207/30252; G06T 7/74; H04N 7/181; H04N 7/18
USPC .......................................................... 348/142
See application file for complete search history.

(56) References Cited

U.S. PATENT DOCUMENTS

| | | | | |
|---|---|---|---|---|
| 5,638,116 A * | 6/1997 | Shimoura | ............ | G05D 1/0246 348/118 |
| 6,025,790 A * | 2/2000 | Saneyoshi | ............ | G05D 1/0251 244/17.11 |
| 6,101,431 A * | 8/2000 | Niwa | .................... | G01C 11/00 340/980 |
| 2001/0048763 A1* | 12/2001 | Takatsuka | ............. | B60R 21/013 382/154 |
| 2003/0113109 A1* | 6/2003 | Pelletier | ................. | G03B 17/24 396/321 |
| 2006/0013480 A1* | 1/2006 | Sano | .................. | G06K 9/00805 382/168 |
| 2008/0188301 A1* | 8/2008 | Kawamoto | ....... | G06F 17/30241 463/31 |
| 2008/0221843 A1* | 9/2008 | Shenkar | .................. | G06T 17/05 703/1 |
| 2008/0310680 A1* | 12/2008 | Azuma | ............. | G06K 9/00791 382/104 |
| 2009/0214080 A1* | 8/2009 | Hamza | ..................... | G06T 7/11 382/103 |
| 2009/0309765 A1* | 12/2009 | Wang | ..................... | G06F 3/017 341/20 |
| 2010/0061701 A1* | 3/2010 | Iwane | ................. | G06T 3/0062 386/241 |
| 2010/0329513 A1* | 12/2010 | Klefenz | ................. | G01C 21/00 382/104 |
| 2011/0254950 A1* | 10/2011 | Bibby | .................... | G06T 7/149 348/135 |
| 2014/0015998 A1 | 1/2014 | Inoshita | | |

* cited by examiner

MOVING-OBJECT POSITION/ATTITUDE ESTIMATION APPARATUS AND MOVING-OBJECT POSITION/ATTITUDE ESTIMATION METHOD

CROSS REFERENCE TO RELATED APPLICATION

The present application claims priority to Japanese Patent Applications No. 2012-049372 filed on Mar. 6, 2012, incorporated herein in its entirety.

TECHNICAL FIELD

The present invention relates to a moving-object position/attitude estimation apparatus and a moving-object position/attitude estimation method which estimate the position and the attitude angle of a moving object.

BACKGROUND

As a technique for calculating the position of a moving object by comparing a three-dimensional map and an image captured by a camera, there has been known a technique described in Japanese Patent Application Publication No. 2009-199572, for example. In Japanese Patent Application Publication No. 2009-199572, first, an edge image is created by extracting edges from an actual video image obtained by an in-vehicle camera installed in a vehicle. A virtual image is created in which a three-dimensional map is projected from the position and at the attitude of the in-vehicle camera, the three-dimensional map including three-dimensional data where the positions and shapes of edges of surroundings are recorded. Then, the position and attitude angle of the in-vehicle camera are adjusted so that the edge image and the virtual image can match each other. In this way, the position and attitude angle of the in-vehicle camera in a three-dimensional space are estimated.

However, in Japanese Patent Application Publication No. 2009-199572, even when an actual video image matches a virtual image, there may be a large error in the position of the in-vehicle camera if the matching place is distant from the in-vehicle camera. On the other hand, if the matching position is near the in-vehicle camera, there may be a large error in the attitude angle of the in-vehicle camera.

SUMMARY

Accordingly, the present invention is proposed in view of the above-described circumstances, and an object of the present invention is to provide a moving-object position/attitude estimation apparatus and a moving-object position/attitude estimation method which can accurately estimate the position and the attitude angle of a moving object.

A moving-object position/attitude estimation apparatus according to a first aspect of the present invention is a moving-object position/attitude estimation apparatus for estimating a position and an attitude angle of a moving object, and includes an image-capturing unit, a comparative image acquiring unit, a likelihood setting unit, and a moving-object position/attitude estimation unit. The image-capturing unit is configured to acquire a captured image by capturing an image of surroundings of the moving object. The comparative image acquiring unit is configured to acquire a comparative image viewed from a predetermined position at a predetermined attitude angle. The likelihood setting unit is configured to compare the captured image acquired by the image-capturing unit and the comparative image acquired by the comparative image acquiring unit. The likelihood setting unit assigns a high attitude angle likelihood to the comparative image in a case where a distant-position pixel in the captured image matches a distant-position pixel in the comparative image and assigns a high position likelihood to the comparative image in a case where a proximal-position pixel in the captured image matches a proximal-position pixel in the comparative image. The moving-object position/attitude estimation unit is configured to estimate the attitude angle of the moving object based on the attitude angle of the comparative image assigned the high attitude angle likelihood by the likelihood setting unit and estimate the position of the moving object based on the position of the comparative image assigned the high position likelihood by the likelihood setting unit.

A moving-object position/attitude estimation method according to a second aspect of the present invention is a moving-object position/attitude estimation method for estimating a position and an attitude angle of a moving object. In the moving-object position/attitude estimation method, a captured image obtained by capturing an image of surroundings of the moving object and a comparative image viewed from a predetermined position at a predetermined attitude angle are compared. In a case where a distant-position pixel in the captured image matches a distant-position pixel in the comparative image, a high attitude angle likelihood is assigned to the comparative image. In a case where a proximal-position pixel in the captured image matches a proximal-position pixel in the comparative image, a high position likelihood is assigned to the comparative image. The attitude angle of the moving object is estimated based on the attitude angle of the comparative image assigned the high attitude angle likelihood. The position of the moving object is estimated based on the position of the comparative image assigned the high position likelihood.

BRIEF DESCRIPTION OF DRAWINGS

FIG. 6 is a graph showing one example of a relationship between the distance from the vehicle and attitude angle likelihood like_a.

DESCRIPTION OF EMBODIMENTS

Hereinafter, embodiments of the present invention will be described with reference to the drawings.

First Embodiment

The configuration of a moving-object position/attitude estimation apparatus according to a first embodiment of the present invention will be described with reference to FIG. 1. The moving-object position/attitude estimation apparatus according to the first embodiment includes an ECU (Engine Control Unit) 1, a camera (one example of an image-capturing unit) 2, a three-dimensional map database 3, and a vehicle sensor group 4. The vehicle sensor group 4 includes a GPS receiver 41, a throttle sensor 42, a steering sensor 43, a brake sensor 44, a vehicle speed sensor 45, an acceleration sensor 46, a wheel speed sensor 47, and other sensor 48 such as a yaw rate sensor. It should be noted that the ECU 1 actually includes a ROM, a RAM, an arithmetic circuit, and the like. The ECU 1 functions as a virtual image acquisition unit 11 (one example of a comparative image acquiring unit), a likelihood setting unit 12, and a moving-object position/attitude estimation unit 13 by executing processing in accordance with a computer program for moving-object position/attitude estimation stored on the ROM.

The camera 2 is configured using a solid image sensor such as a CCD or the like. The following description will be made for the case where a moving object is a vehicle. The camera 2 is installed in, for example, a front portion (position) of the vehicle to face in a direction in (at an attitude angle at) which the camera 2 can capture an image in the heading direction of the vehicle. The camera 2 captures an image of surroundings of the vehicle and acquires a captured image at time intervals of a predetermined length. The acquired captured image is supplied to the ECU 1.

The three-dimensional map database 3 stores three-dimensional position information such as edges of surroundings including road surface markings. In this embodiment, the three-dimensional map database 3 stores, as the three-dimensional position information, edge information on road surface markings such as white lines, stop lines, pedestrian crossings, road surface symbols, and the like as well as structures such as curbs, buildings, and the like. The three-dimensional position information is defined using a set of edges. In the case of a long straight line, the straight line is divided into, for example, one-meter edges. Accordingly, there is no extremely long edge. In the case of a straight line, each edge has three-dimensional position information indicating two end points of the straight line. In the case of a curved line, each edge has three-dimensional position information indicating two end points and a central point of the curved line.

The vehicle sensor group 4 is connected to the ECU 1. The vehicle sensor group 4 supplies various sensor values detected by the sensors 41 to 48 to the ECU 1. The ECU 1 calculates an approximate position of the vehicle and odometry data indicating the amount traveled per unit time by the vehicle using output values from the vehicle sensor group 4.

The ECU 1 is an electronic control unit configured to estimate the position and the attitude angle of the vehicle using a captured image captured by the camera 2 and the three-dimensional position information stored in the three-dimensional map database 3. It should be noted that an ECU for use in other control functions may also be used as the ECU 1.

Figure 2A:
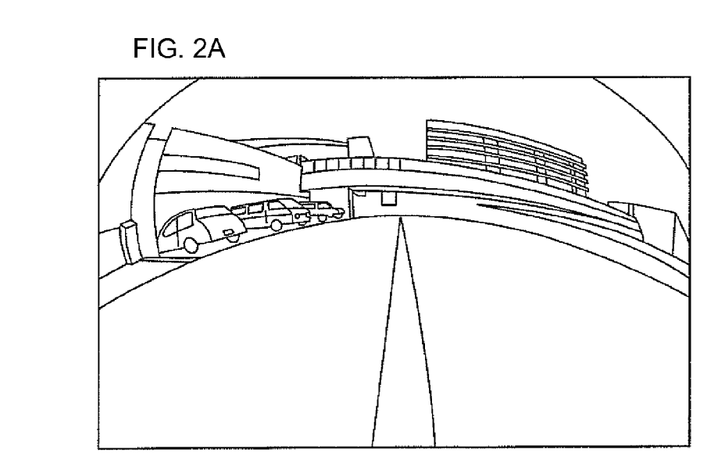
FIG. 2(a) shows a captured image captured by an image-capturing unit.
Figure 2B:
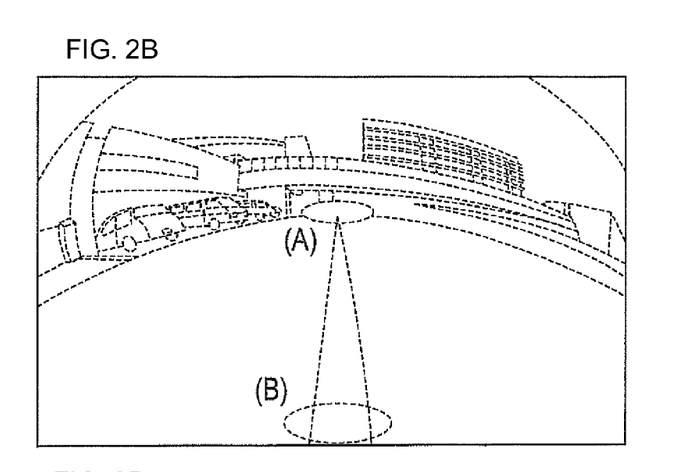
FIG. 2(b) shows an edge image obtained by extracting edges from the captured image shown in FIG. 2(a).
Figure 2C:
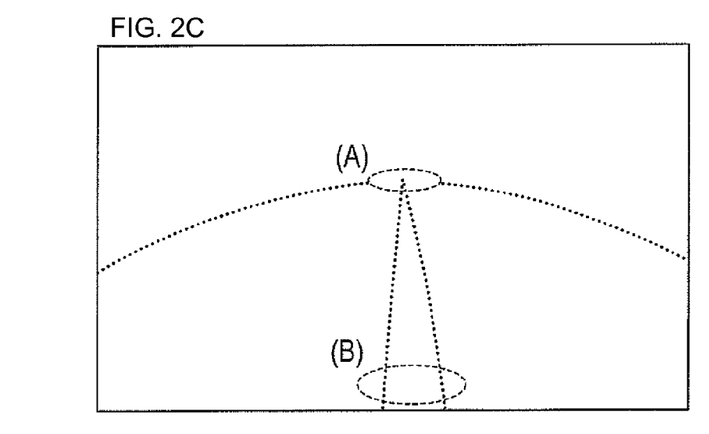
FIG. 2(c) is a virtual image acquired by a virtual image acquisition unit.
Figure 2D:
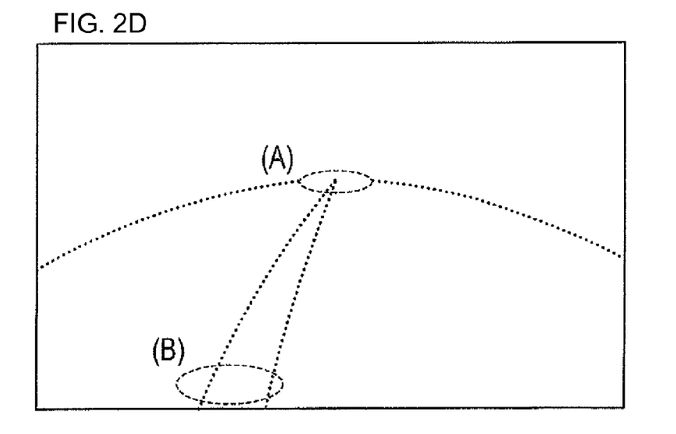
FIG. 2(d) is a plan view showing a virtual image for the case where the virtual position shown in FIG. 2(c) is shifted to the right.

In particular, the moving-object position/attitude estimation apparatus estimates the position and the attitude angle of the vehicle by comparing a captured image captured by the camera 2 with a comparative image viewed from a predetermined position at a predetermined attitude angle. It should be noted that in the embodiment, a "virtual image obtained by converting three-dimensional map data to an image captured from a virtual position and a virtual attitude angle" is used as one example of "a comparative image viewed from a predetermined position at a predetermined attitude angle." It is now assumed that a captured image such as shown in FIG. 2(a) is obtained, and that an edge image such as shown in FIG. 2(b) is obtained. On the other hand, it is assumed that a virtual image such as shown in FIG. 2(c) is obtained by projecting the three-dimensional position information to the position and the attitude angle of the camera 2. The comparison between the captured image shown in FIG. 2(b) and the virtual image shown in FIG. 2(c) shows that these images match at both of a distant position (A) and a proximal position (B). Accordingly, it can be estimated that the virtual position and the virtual attitude angle at which the virtual image has been generated correspond to the position and the attitude angle of the vehicle itself. However, in the case where the virtual position is shifted to the right, the virtual image such as shown in FIG. 2(d) is obtained. In that case, the comparison between the captured image shown in FIG. 2(a) and the captured image shown in FIG. 2(d) shows that these images match at a distant position (A) but a proximal position (B) has a large gap. In contrast, when the virtual attitude angle is shifted (not shown) in the virtual image shown in FIG. 2(c), the comparison between the resultant image and the captured image shown in FIG. 2(a) shows that these images match at a proximal position (B) but a distant position (A) has a large gap.

In view of such phenomena, in the case where a proximal-position pixel in the captured image matches a proximal-position pixel in the virtual image, the moving-object position/attitude estimation apparatus determines that the virtual position of the virtual image is likely. On the other hand, in the case where a distant-position pixel in the captured image matches a distant-position pixel in the virtual image, the moving-object position/attitude estimation apparatus determines that the virtual attitude angle of the virtual image is likely.

Figure 3:
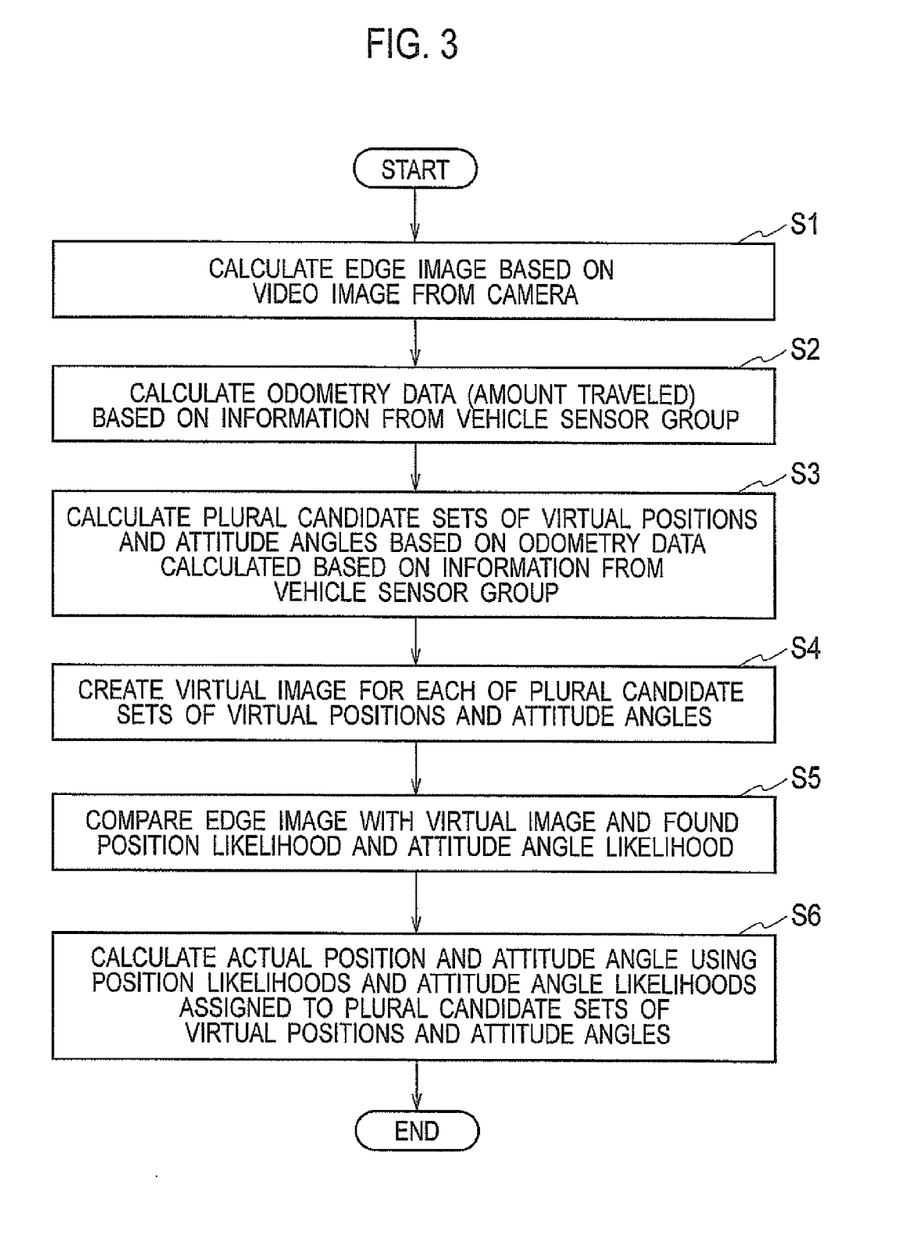
FIG. 3 is a flowchart showing one example of the operation procedure of the moving-object position/attitude estimation apparatus according to the first embodiment of the present invention.

Hereinafter, the operation of the moving-object position/attitude estimation apparatus will be described with reference to a position/attitude estimation algorithm shown in FIG. 3. It should be noted that in this embodiment, the three-degree-of-freedom position (forward/backward position, left/right position, and vertical position) and the three-degree-of-freedom attitude angle (roll, pitch, and yaw) of the vehicle are estimated. Moreover, the position/attitude estimation algorithm shown in FIG. 3 is consecutively executed by the ECU 1 every predetermined period of time on the order of, for example, 100 msec.

First, in step S1, the ECU 1 acquires a video image captured by the camera 2, and calculates an edge image based on a captured image contained in the video image. In this embodiment, an edge refers to a portion containing a sharp intensity change between pixels. As an edge detection method, for example, Canny edge detection can be used. The edge detection method is not limited to this, but other various schemes such as differential edge detection can be used.

Moreover, the ECU 1 desirably extracts the direction of intensity change of each edge, colors near the edge, and the like from the captured image captured by the camera 2. In that case, in steps S5 and S6 to be described later, the ECU 1 may estimate the position and the attitude angle of the vehicle by setting a position likelihood and an attitude angle likelihood also using these pieces of information other than edges also recorded in the three-dimensional map database 3.

Next, in step S2, the ECU 1 calculates odometry data which indicates the amount traveled from the position of the vehicle calculated in the previous execution of the loop of the position/attitude estimation algorithm based on sensor values obtained from the vehicle sensor group 4. It should be noted that in the case of a first execution of the loop of the position/attitude estimation algorithm, the ECU 1 performs calculation by setting the odometry data to zero.

ECU 1 calculates odometry data which indicates the amount traveled per unit time by the vehicle using various kinds of sensor values obtained from the vehicle sensor group 4. The odometry data may be calculated as follows: for example, with the vehicle motion limited to a horizontal plane, the vehicle speed and the yaw rate are calculated based on sensor values detected by a wheel speed sensor for each wheel and a steering sensor, and the amount traveled and the amount of rotation per unit time are calculated. The ECU 1 may use the vehicle speed or the difference between measurements of the GPS receiver 41 instead of the wheel speed, and may use the steering angle instead of the yaw rate sensor. It should be noted that various methods are possible for calculating odometry data, and that any method may be used as long as the method can calculate odometry data.

Next, in step S3, the ECU 1 (comparative image acquiring unit) acquires a comparative image viewed from a predetermined position at a predetermined attitude angle. Specifically, the virtual image acquisition unit 11 as one example of a comparative image acquiring unit calculates plural candidate sets of virtual (predicted) positions and virtual (predicted) attitude angles based on the odometry data calculated in step S2. The plural candidate sets of virtual positions and virtual attitude angles are candidates for the position and the attitude angle of the vehicle. The virtual image acquisition unit 11 shifts the vehicle position estimated in step S6 in the previous execution of the loop in accordance with the odometry data calculated in step S2 in the current execution of the loop. The virtual image acquisition unit 11 calculates plural candidate sets of virtual positions and virtual attitude angles in the vicinity of the position to which the vehicle position is shifted. It should be noted, however, that in the case of a first execution of the loop of the position/attitude estimation algorithm, the ECU 1 has no previous vehicle position information. Accordingly, the virtual image acquisition unit 11 regards data from the GPS receiver 41 included in the vehicle sensor group 4 as initial position information. Alternatively, the virtual image acquisition unit 11 may store a vehicle position and an attitude angle calculated last when the vehicle has previously stopped and use the position and the attitude angle of the vehicle as initial position-and-attitude-angle information.

The virtual image acquisition unit 11 generates plural candidate sets of virtual positions and virtual attitude angles which have values possible for the true values of the position and the attitude angle of the vehicle, taking account of odometry errors induced by measurement errors and communication delays of the vehicle sensor group 4 and dynamic characteristics of the vehicle which cannot be taken into account in odometry. The candidate sets of virtual positions and virtual attitude angles are randomly generated using a random number table or the like within the respective ranges between upper and lower error limits set for position and attitude angle parameters of six degrees of freedom.

It should be noted that in this embodiment, 500 virtual position and virtual attitude angle candidates are created. Moreover, the upper and lower error limits of the position and attitude angle parameters of six degrees of freedom are set to ±0.05 [m], ±0.05 [m], ±0.05 [m], ±0.5 [deg], ±0.5 [deg], and ±0.5 [deg] in the order of forward/backward position, left/right position, vertical position, roll, pitch, and yaw. It is desirable that the number of virtual position and virtual attitude angle candidates to be created and the upper and lower error limits of the position and attitude angle parameters of six degrees of freedom be appropriately changed by detecting or estimating the driving state of the vehicle and the state of the road surface. For example, during hard cornering, skidding, or the like, errors in horizontal directions (forward/backward position, left/right position, and yaw) are highly likely to increase. Accordingly, it is desirable to increase the upper and lower error limits of these three parameters and to increase the number of candidate sets of virtual positions and virtual attitude angles to be created.

Figure 4:
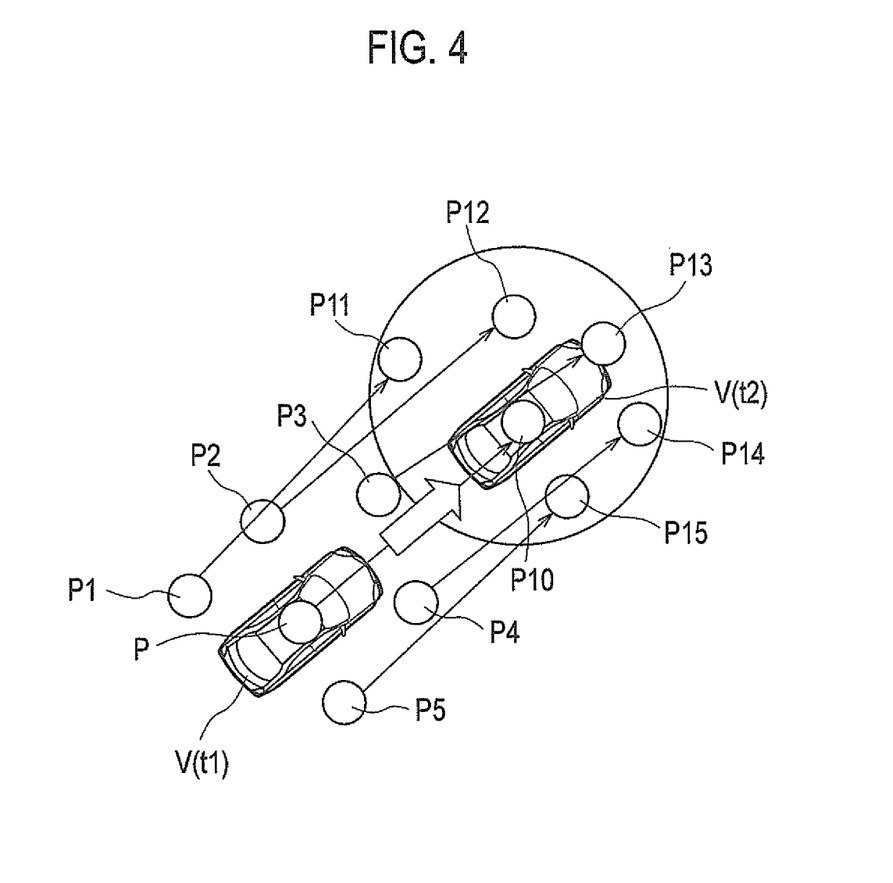
FIG. 4 is a plan view for explaining the operation of shifting particles (candidate points).

In step S3, the virtual image acquisition unit 11 may set plural candidate sets of virtual positions and virtual attitude angles using a so-called particle filter. In that case, the virtual image acquisition unit 11 shifts the position and the attitude angle of each of particles (candidate points), which are plural candidate sets of virtual positions and virtual attitude angles generated in step S6 in the previous execution of the loop, in accordance with the odometry data. Specifically, as shown in FIG. 4, a particle P of the position and the attitude angle of the vehicle (t1) estimated in the previous execution of the loop and particles P1 to P5 around the particle P are shifted in accordance with the odometry data. As a result, the virtual image acquisition unit 11 sets particles P10 to P15 for estimating a new position and a new attitude angle of the vehicle V (t2). Thus, the virtual image acquisition unit 11 calculates plural candidate sets of virtual positions and virtual attitude angles in the current execution of the loop. In other words, the positions and the attitude angles of the particles are used as plural candidate sets of virtual positions and virtual attitude angles. It is more preferable that position information and attitude angle information on each particle are shifted in accordance with the odometry data and then randomly changed within the respective ranges between the upper and lower error limits of the position and attitude angle parameters of six degrees of freedom using a random number table or the like as described above, with taken into account odometry errors induced by measurement errors and communication delays of the vehicle sensor group 4 and dynamic characteristics of the vehicle which cannot be taken into account in odometry.

It should be noted, however, that in the case of a first execution of the loop of the position/attitude estimation algorithm, each particle has no position information and no attitude angle information. Accordingly, detection data from the GPS receiver 41 included in the vehicle sensor group 4 may be used as initial position information. Alternatively, position information and attitude angle information on each particle may be set based on a vehicle position estimated last when the vehicle has previously stopped. In this embodiment, in the case of a first execution of the loop, the upper and lower error limits of the position and attitude angle parameters of six degrees of freedom are set based on a vehicle position estimated last when the vehicle has previously stopped. Further, position information and attitude angle information on each particle are randomly set within the upper and lower error limits using a random number table or the like. In this embodiment, in the case of a first loop, 500 particles are created. Moreover, the upper and lower error limits of the parameters of six degrees of freedom for each particle are set to ±0.05 [m], ±0.05 [m], ±0.05 [m], ±0.5 [deg], ±0.5 [deg], and ±0.5 [deg] in the order of forward/backward position, left/right position, vertical position, roll, pitch, and yaw.

Next, in step S4, for each of the plural candidate sets of virtual positions and virtual attitude angles created in step S3, the virtual image acquisition unit 11 creates a virtual image (projected image). At this time, the virtual image acquisition unit 11 creates the virtual image by converting three-dimensional position information such as edges or the like stored in the three-dimensional map database 3 to a camera image captured from the virtual position at the virtual attitude angle. This virtual image is an image for evaluating whether or not each candidate set of a virtual position and a virtual attitude angle matches the actual set of the position and the attitude angle of the vehicle. Processing for conversion to the virtual image requires external parameters indicating the position of the camera 2 and internal parameters of the camera 2. The external parameters can be calculated based on candidate sets of virtual positions and virtual attitude angles by measuring the relative position of the camera 2 to the vehicle position (e.g., the position of the center of the vehicle) in advance. Moreover, the internal parameters can be obtained by performing a calibration in advance.

It should be noted that in the case where the direction of intensity change of each edge, colors near the edge, and the like can also be extracted from the captured image captured in step S1 by the camera 2, it is more preferable that three-dimensional position information on such variables is also stored in the three-dimensional map database 3 to be used in the creation of the virtual image.

In step S5, for each of the plural candidate sets of virtual positions and virtual attitude angles set in step S3, the ECU 1 (likelihood setting unit 12) compares the edge image created in step S1 with the virtual image created in step S4. Based on the result of comparison, the likelihood setting unit 12 sets a position likelihood and an attitude angle likelihood for each candidate set of the virtual position and the virtual attitude angle. The position likelihood is a measure of how likely a virtual position candidate is to be the actual position of the vehicle. The attitude angle likelihood is a measure of how likely a virtual attitude angle candidate is to be the actual attitude angle of the vehicle. The likelihood setting unit 12 sets a higher position likelihood or a higher attitude angle likelihood as the degree of matching between the virtual image and the edge image increases. It should be noted that a method of finding a position likelihood or an attitude angle likelihood will be described later.

If the comparison of the captured image and the virtual image by the likelihood setting unit 12 shows that a distant-position pixel in the captured image matches a distant-position pixel in the virtual image, the likelihood setting unit 12 assigns a high attitude angle likelihood to the virtual image. If the comparison of the captured image and the virtual image by the likelihood setting unit 12 shows that a proximal-position pixel in the captured image matches a proximal-position pixel in the virtual image, the likelihood setting unit 12 assigns a high position likelihood to the virtual image. The distant-position pixels and the proximal-position pixels may be set in terms of, for example, positions in the captured image and the virtual image. For example, in each of the captured image and the virtual image, a region having a predetermined width in the vertical direction and extending from an intermediate position to a lower position may be set to be an image region in which distant-position pixels are present. Moreover, in each of the captured image and the virtual image, a region having a predetermined width in the vertical direction and extending from a bottom position to an upper position may be set to be an image region in which proximal-position pixels are present. The distance can be found based on the position of the camera 2 assumed when the virtual image is found by projecting a three-dimensional map to the camera 2.

Specifically, the likelihood setting unit 12 determines whether or not an edge matches between the virtual image and the edge image, i.e., whether or not the edge on the edge image is located at the pixel coordinate position of the edge on the virtual image. If the edge matches between the virtual image and the edge image, the likelihood setting unit 12 references the three-dimensional map database 3 for the matching edge and finds the position of the matching edge on a three-dimensional space. Then, the likelihood setting unit 12 finds the distance L (unit: m) between the matching edge portion and the position information on the candidate set of the virtual position and the virtual attitude angle for which a position likelihood is to be found, and regards the reciprocal of the distance L as the position likelihood like_p (unit: none). It should be noted that if the edge does not match between the virtual image and the edge image, the likelihood setting unit 12 sets the position likelihood like_p to 0.

The likelihood setting unit 12 carries out the above-described processing for each of all the pixels on the virtual image. In the case where the edge image matches the virtual image in a portion near the vehicle, the likelihood setting unit 12 assigns a high position likelihood like_p to the pixel. On the other hand, in the case where the edge image matches the virtual image in a portion distant from the vehicle, the ECU 1 assigns a low position likelihood like_p to the pixel. The likelihood setting unit 12 regards the total sum of the position likelihoods like_p of all the pixels as the position likelihood LIKE_P (unit: none) of the virtual image.

Figure 5:
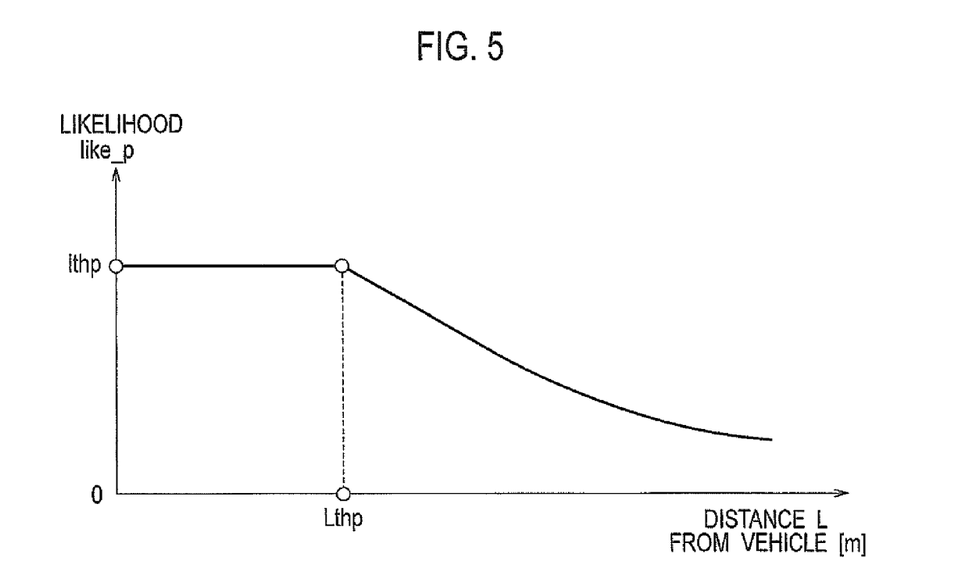
FIG. 5 is a graph showing one example of a relationship between the distance from a vehicle and position likelihood like_p.

When the likelihood setting unit 12 finds a position likelihood like_p, the likelihood setting unit 12 may use an upper limit depending on the distance from the vehicle as shown in FIG. 5. In the case where a pixel on the edge image (captured image) and the corresponding pixel on the virtual image match each other at a position located at or within a predetermined distance Lthp from the camera 2, the likelihood setting unit 12 assigns a predetermined upper limit lthp as a position likelihood like_p to the pixel. Alternatively, the likelihood setting unit 12 may increase the likelihood like_p at a lower rate as the distance from the vehicle decreases. It should be noted that in this embodiment, the distance Lthp is set to 1.0 [m].

Specifically, the likelihood setting unit 12 prepares a position likelihood setting map which describes the relationship between the distance from the vehicle and position likelihood like_p. The ECU 1 references the position likelihood setting map and assigns a position likelihood like_p depending on the distance from the vehicle at which the edge image matches the virtual image.

Thus, even when an edge extracted from a portion extremely near the vehicle (camera 2) contains noise or error, the influence thereof can be reduced, and the error of estimation of the position can be reduced.

The ECU 1 also finds an attitude angle likelihood. In the case where an edge portion matches between the virtual image and the edge image, the likelihood setting unit 12 finds the distance L (unit: m) from the vehicle to a matching pixel as in the case where the likelihood setting unit 12 finds a position likelihood LIKE_P. The likelihood setting unit 12 regards the distance L from the vehicle divided by 10 as the attitude angle likelihood like_a (unit: none). It should be noted that in the case where an edge portion does not match between the virtual image and the edge image, the likelihood setting unit 12 sets the attitude angle likelihood like_a to 0.

The likelihood setting unit 12 carries out processing for assigning an attitude angle likelihood like_a, for each of all the pixels on the virtual image. In the case where the edge image matches the virtual image in a portion distant from the vehicle, the likelihood setting unit 12 assigns a high attitude angle likelihood like_a to the pixel. On the other hand, in the case where the edge image matches the virtual image in a portion near the vehicle, the likelihood setting unit 12 assigns a low attitude angle likelihood like_a to the pixel. The likelihood setting unit 12 regards the total sum of the attitude angle likelihoods like_a of all the pixels as the attitude angle likelihood LIKE_A (unit: none) of the virtual image.

Figure 6:
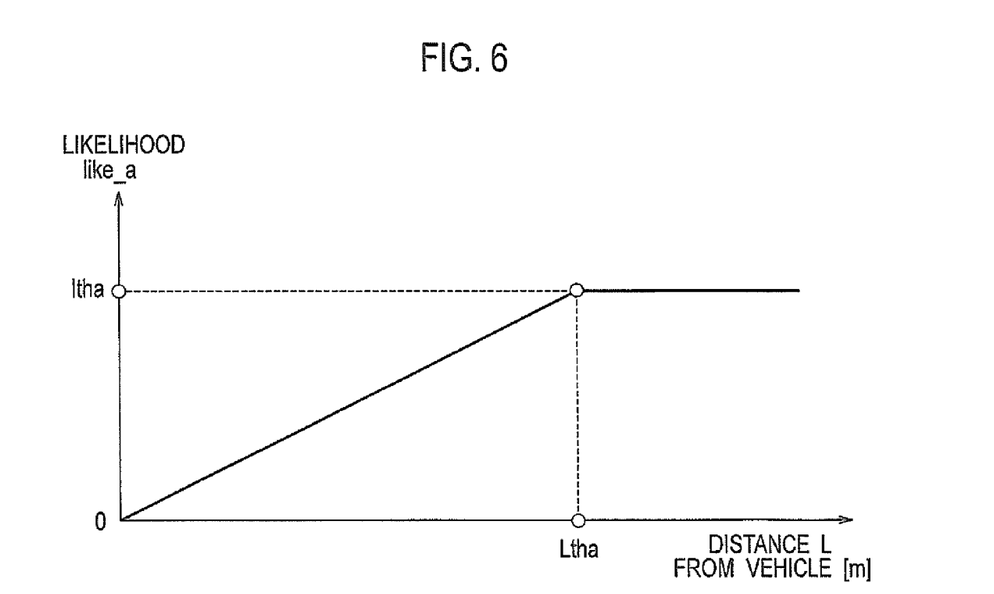

When the likelihood setting unit 12 finds an attitude angle likelihood like_a, the likelihood setting unit 12 may use an upper limit depending on the distance from the vehicle as shown in FIG. 6. In the case where a pixel on the edge image (captured image) matches the corresponding pixel on the virtual image at a position located at or beyond a predetermined distance Ltha from the camera 2, the ECU 1 assigns a predetermined upper limit ltha as an attitude angle likelihood like_a. Alternatively, the ECU 1 may increase the attitude angle likelihood like_a at a lower rate as the distance from the vehicle increases. It should be noted that in this embodiment, the distance Ltha is set to 30.0 [m].

Specifically, the likelihood setting unit 12 prepares an attitude angle likelihood setting map which describes the relationship between the distance from the vehicle and attitude angle likelihood like_a. The ECU 1 references the attitude angle likelihood setting map and assigns an attitude angle likelihood like_a depending on the distance from the vehicle at which the edge image matches the virtual image.

Thus, even when an edge extracted from a portion extremely distant from the vehicle (camera 2) contains noise or error, the influence thereof can be reduced, and the error of estimation of the attitude angle can be reduced.

The likelihood setting unit 12 finds a position likelihood LIKE_P and an attitude angle likelihood LIKE_A for each virtual image. Specifically, the likelihood setting unit 12 calculates a position likelihood LIKE_P and an attitude angle likelihood LIKE_A for each candidate set of a virtual position and a virtual attitude angle. Using all results for plural candidate sets of virtual positions and virtual attitude angles, the likelihood setting unit 12 performs normalization such that each of the sum of position likelihoods LIKE_P and the sum of attitude angle likelihoods LIKE_A becomes one.

Next, in step S6, using the plural candidate sets of virtual positions and virtual attitude angles for which position likelihoods LIKE_P and attitude angle likelihoods LIKE_A have been found in step S5, the moving-object position/attitude estimation unit 13 calculates the ultimate position and attitude angle of the vehicle. The moving-object position/attitude estimation unit 13 estimates the actual attitude angle of the vehicle based on the attitude angle of the virtual image to which a high attitude angle likelihood LIKE_A is assigned. The moving-object position/attitude estimation unit 13 estimates the actual position of the vehicle based on the position of the virtual image to which a high position likelihood LIKE_P is assigned.

For the estimation, the moving-object position/attitude estimation unit 13 may calculate as the actual position and attitude angle of the vehicle, for example, the virtual position and the virtual attitude angle of the virtual image assigned the highest position likelihood LIKE_P; or the moving-object position/attitude estimation unit 13 may calculate as the actual position and attitude angle of the vehicle the virtual position and the virtual attitude angle of the virtual image assigned the highest attitude angle likelihood LIKE_A; or the moving-object position/attitude estimation unit 13 may calculate as the actual position and attitude angle of the vehicle the virtual position and the virtual attitude angle of the virtual image which has the highest sum of the position likelihood LIKE_P and the attitude angle likelihood LIKE_A; or the moving-object position/attitude estimation unit 13 may weight each candidate set of a virtual position and a virtual attitude angle according to the position likelihood LIKE_P of each virtual image and calculate average values of the weighted virtual position and virtual attitude angle as the actual position and attitude angle of the vehicle; or the moving-object position/attitude estimation unit 13 may weight each candidate set of a virtual position and a virtual attitude angle according to the attitude angle likelihood LIKE_A of each virtual image and calculate average values of the weighted virtual position and virtual attitude angle as the actual position and attitude angle of the vehicle; or the moving-object position/attitude estimation unit 13 may weight each candidate set of a virtual position and a virtual attitude angle according to the sum of the position likelihood LIKE_P and the attitude angle likelihood LIKE_A of each virtual image and calculate average values of the weighted virtual position and virtual attitude angle as the actual position and attitude angle of the vehicle.

In the case where a particle filter is used in step S3, first, a weight is assigned to each particle according to each of the position likelihood LIKE_P and the attitude angle likelihood LIKE_A. Then, the moving-object position/attitude estimation unit 13 regards the virtual position of the particle having the highest position likelihood LIKE_P as the actual position of the vehicle; or the moving-object position/attitude estimation unit 13 may weight each of the virtual positions of the plural particles according to the position likelihood LIKE_P and calculate the average value of the weighted virtual positions of the plural particles as the actual position of the vehicle; or the moving-object position/attitude estimation unit 13 may calculate the virtual attitude angle of the particle having the highest attitude angle likelihood LIKE_A as the actual attitude angle of the vehicle; or the moving-object position/attitude estimation unit 13 may weight each of the virtual attitude angles of the plural particles according to the attitude angle likelihood LIKE_A and calculate the average value of the weighted virtual attitude angles of the plural particles as the actual attitude angle of the vehicle.

Further, the virtual image acquisition unit 11 performs the resampling of the particles based on the position likelihood LIKE_P and the attitude angle likelihood LIKE_A. In other words, the virtual image acquisition unit 11 resets plural sets of virtual positions and virtual attitude angles based on the attitude angle likelihoods of the plural virtual images and the position likelihoods of the plural virtual images.

Specifically, the virtual image acquisition unit 11 performs the resampling of the particles around the particle having the largest sum of the position likelihood LIKE_P and the attitude angle likelihood LIKE_A. Alternatively, the virtual image acquisition unit 11 temporarily separates the position information and the attitude angle information on each particle, and performs the resampling of the particles having only position information based on the position likelihoods LIKE_P and the resampling of the particle having only attitude angle information based on the attitude angle likelihoods LIKE_A. After that, the virtual image acquisition unit 11 may randomly combine the position information on the particles having only position information and the attitude angle information on the particles having only attitude angle information to newly reconfigure particles having position information and attitude angle information.

The ECU 1 can calculate the position and the attitude angle of the vehicle in real time by repeating the processing from step S1 to step S6 such as described above.

As described in detail above, the moving-object position/attitude estimation apparatus described as the embodiment compares a captured image with a virtual image, and assigns a high attitude angle likelihood to the virtual image in the case where a distant-position pixel in the captured image matches a distant-position pixel in the virtual image. On the other hand, in the case where a proximal-position pixel in the captured image matches a proximal-position pixel in the virtual image, the moving-object position/attitude estimation apparatus assigns a high position likelihood to the virtual image. Further, the moving-object position/attitude estimation apparatus estimates the actual attitude angle of a moving object based on the virtual attitude angle of the virtual image assigned a high attitude angle likelihood, and, on the other hand, estimates the actual position of the moving object based on the virtual position of the virtual image assigned a high position likelihood.

The moving-object position/attitude estimation apparatus can assign likelihoods to positions and attitude angles separately, and adjust and estimate the position and the attitude angle separately depending on the distance to a place at which an actual video image matches a virtual image. Specifically, in the case where the captured image matches the virtual image at a place distant from the camera 2, the virtual attitude angle is close to the true value, but the virtual position may have a large error. Accordingly, a high attitude angle likelihood can be assigned to the virtual image, but a not-so-high position likelihood is assigned to the virtual image. On the other hand, in the case where the captured image matches the virtual image at a place near the camera 2, a high position likelihood is assigned to the virtual image, but a not-so-high attitude angle likelihood is assigned to the virtual image.

In the case where a place at which the captured image matches the virtual image is distant from the camera 2, there may be a large error in the virtual position. On the other hand, in the case where a place at which the captured image matches the virtual image is near the camera 2, there may be a large error in the virtual attitude angle. This moving-object position/attitude estimation apparatus can accurately estimate the position and the attitude angle of a moving object.

Moreover, in the case where a pixel in the captured image and a pixel in the virtual image match each other at a more distant position located at or beyond a predetermined distance from the camera 2, the attitude angle likelihood of the virtual image is set such that the attitude angle likelihood is set to a value increased at a low rate or a predetermined upper limit. Thus, when the video image to be matched contains a portion extremely distant from the camera 2, the moving-object position/attitude estimation apparatus can prevent the attitude angle likelihood from being determined in accordance with the degree of matching in the distant portion. Thus, even when an edge extracted from a portion extremely distant from the camera 2 contains noise or error, the influence thereof can be reduced, and the error of estimation of the attitude angle can be reduced.

Further, in the case where a pixel in the captured image and a pixel in the virtual image matches at a nearer position located at or within a predetermined distance from the camera 2, the position likelihood of the virtual image is set such that the position likelihood is set to a value increased at a low rate or a predetermined upper limit. This prevents a too high position likelihood from being assigned in the case where two video images match at a position or within the predetermined distance from the camera 2. Accordingly, in the moving-object position/attitude estimation apparatus, even when an edge extracted from a portion extremely near the camera 2 contains noise or error, the influence thereof can be reduced, and the error of estimation of the position can be reduced.

Further, the moving-object position/attitude estimation apparatus generates plural particles (candidate points) and assigns a position likelihood LIKE_P and an attitude angle likelihood LIKE_A to each particle. Based on the position likelihoods LIKE_P and the attitude angle likelihoods LIKE_A assigned to the particles, the position and the attitude angle of the vehicle are found. Further, based on the position likelihoods LIKE_P and the attitude angle likelihoods LIKE_A, the resampling of the particles can be performed.

It should be noted that in a particle filter, in the case where the degree of estimation is n, to multiply the precision of estimation by a, the number of particles to be distributed also needs to be multiplied by a raised to the nth power in principle (Probabilistic Robotics, Chapter 4, Section 3 (Sebastian Thrun/Wolfram Burgard/Dieter Fox, Japanese Version, translated by Ryuichi Ueda, published by Mainichi Communications Inc.). In existing techniques, for example, in the case where three-dimensional position information and attitude angle information are simultaneously estimated, the degree is six. Accordingly, to double the precision of estimation, the time of calculation is increased by 64-fold; and to triple the precision of estimation, the time of calculation is increased by 729-fold.

On the other hand, in the moving-object position/attitude estimation apparatus according to this embodiment, position information and attitude angle information can be dealt with separately. Accordingly, in principle, to double the precision of estimation, the time of calculation is increased by $2^3 \times 2 = 16$-fold; and to triple the precision of estimation, the time of calculation is increased by $3^3 \times 2 = 54$-fold. Thus, the processing load can be greatly reduced.

Second Embodiment

In a second embodiment of the present invention, a moving-object position/attitude estimation apparatus and a moving-object position/attitude estimation method will be described which separately estimate the position and the attitude angle of the vehicle using different virtual images.

Specifically, in the first embodiment, plural candidate points (particles) each of which is a combination of a virtual position and a virtual attitude angle are generated, the position and the attitude angle of the vehicle are estimated based on respective virtual images acquired for the candidate points. On the other hand, in the second embodiment, virtual images in a region near the vehicle based on plural virtual positions are acquired, and the position of the vehicle is estimated using the virtual images in the region near the vehicle. Further, virtual images in a region distant from the vehicle based on plural virtual attitude angles are acquired, and the attitude angle of the vehicle is estimated using the virtual images in the region distant from the vehicle. That is to say, the second embodiment is different from the first embodiment in that virtual images to be used to estimate the position of the vehicle are different from those to be used to estimate the attitude angle of the vehicle.

Figure 1:
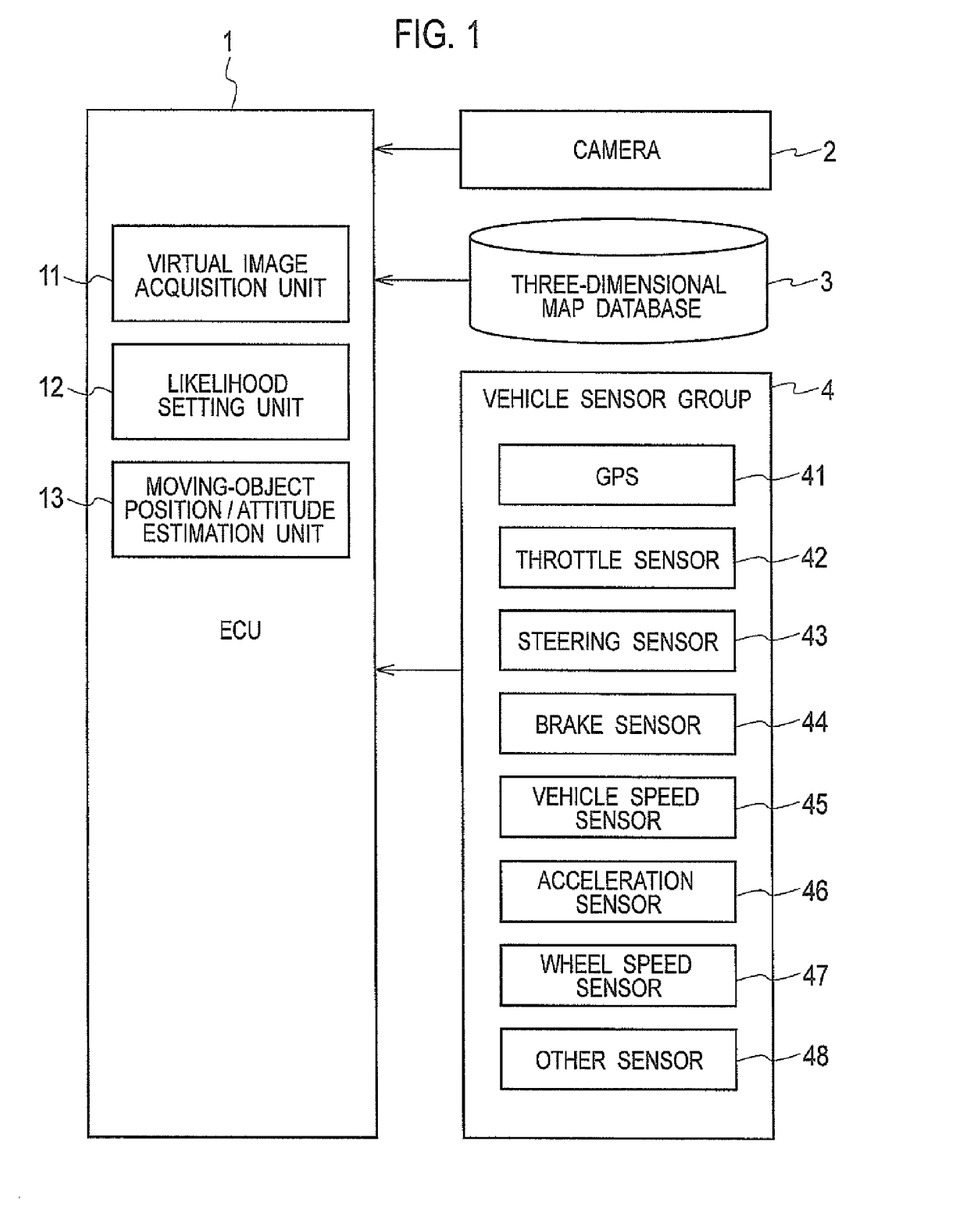
FIG. 1 is a block diagram showing the configuration of a moving-object position/attitude estimation apparatus according to a first embodiment of the present invention.

It should be noted that the hardware configuration of the moving-object position/attitude estimation apparatus according to the second embodiment is the same as the configuration shown in FIG. 1, and will not be further described. However, the software configuration of the ECU 1, i.e., the virtual image acquisition unit 11, the likelihood setting unit 12, and the moving-object position/attitude estimation unit 13, is different as described below.

Figure 7:
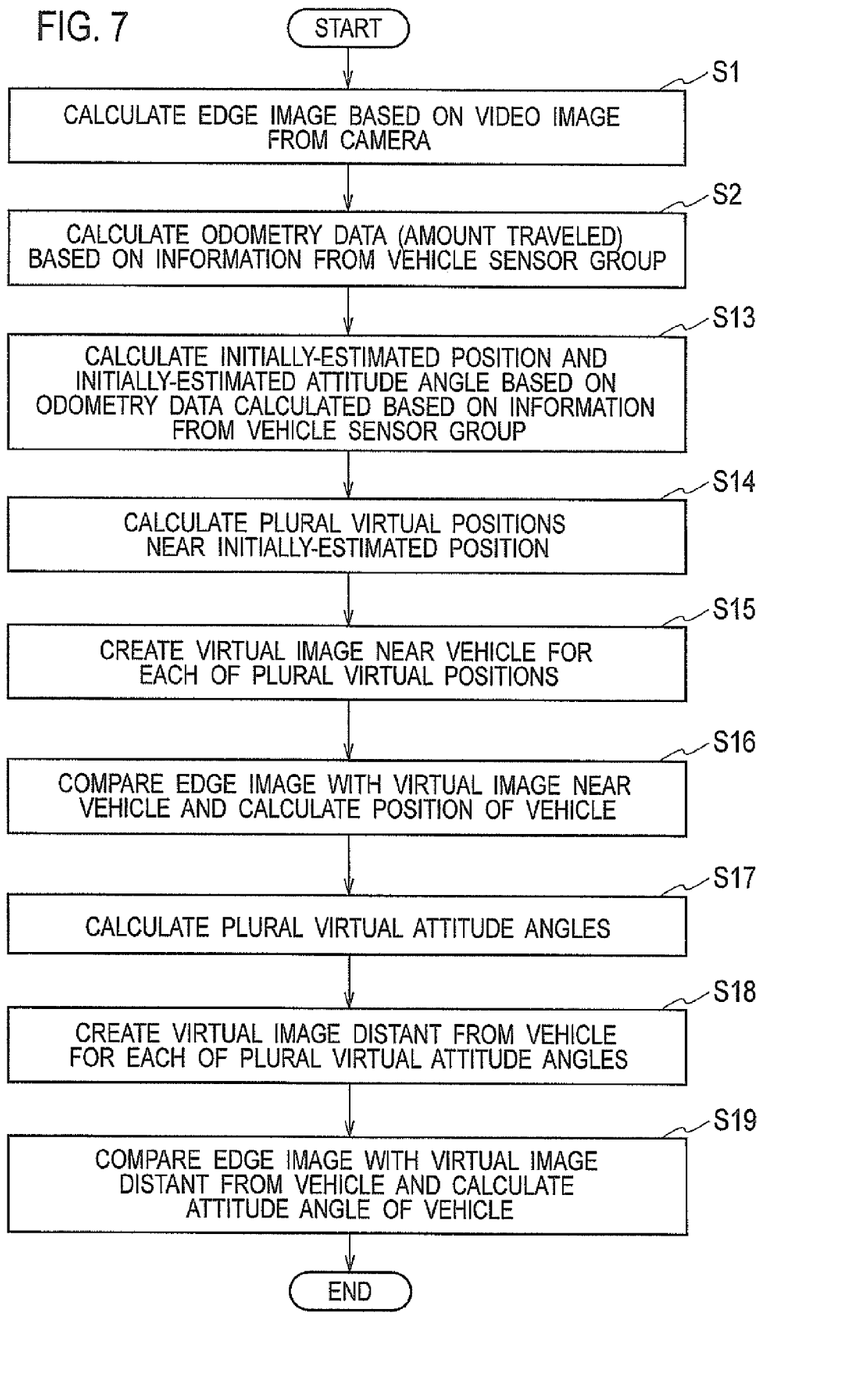
FIG. 7 is a flowchart showing one example of the operation procedure of a moving-object position/attitude estimation apparatus according to a second embodiment of the present invention.

Next, the operation of the moving-object position/attitude estimation apparatus will be described with reference to a position/attitude estimation algorithm shown in FIG. 7. It should be noted that in this embodiment, the three-degree-of-freedom position (forward/backward position, left/right position, and vertical position) and the three-degree-of-freedom attitude angle (roll, pitch, and yaw) of the vehicle are estimated. Moreover, the position/attitude estimation algorithm shown in FIG. 7 is consecutively executed by the ECU 1 every predetermined period of time on the order of, for example, 100 msec.

Processing from step S1 to step S2 is the same as the processing from step S1 to step S2 described with reference to FIG. 3, and will not be further described.

After step S2, the algorithm goes to step S13. The ECU 1 (virtual image acquisition unit 11) calculates an initially-estimated position and an initially-estimated attitude angle which have six degrees of freedom, based on the odometry data calculated in step S2. Specifically, the virtual image acquisition unit 11 calculates as the initially-estimated position a position shifted from the position of the vehicle estimated in step S16 in the previous execution of the loop in accordance with the odometry data calculated in step S2 in the current execution of the loop. It should be noted, however, that in the case of a first execution of the loop of the position/attitude estimation algorithm, the ECU 1 has no previous vehicle position information. Accordingly, the virtual image acquisition unit 11 regards data from the GPS receiver 41 included in the vehicle sensor group 4 as initially-estimated position. Alternatively, the virtual image acquisition unit 11 may store a vehicle position and an attitude angle calculated last when the vehicle has previously stopped and use the position and the attitude angle of the vehicle as an initially-estimated position and an initially-estimated attitude angle.

The algorithm goes to step S14. The virtual image acquisition unit 11 generates plural virtual positions at the initially-estimated position calculated in step S13 and nearby positions thereof. At this time, the virtual image acquisition unit 11 generates plural virtual positions which have values possible for the true value of the position of the vehicle, taking account of odometry errors induced by measurement errors and communication delays of the vehicle sensor group 4 and dynamic characteristics of the vehicle which cannot be taken into account in odometry. The virtual positions are generated at intervals of a predetermined distance within the respective ranges between upper and lower error limits set for the parameters of three degrees of freedom which describe the position. In this embodiment, the upper and lower error limits of the parameters of three degrees of freedom which describe the position are set to ±0.2 [m], ±0.1 [m], and ±0.05 [m] in the order of forward/backward position, left/right position, and vertical position, and virtual positions are generated at intervals of 0.01 [m]. Accordingly, 40×20×10=8000 virtual positions are generated. It is desirable that the upper and lower error limits and the intervals of the predetermined distance be appropriately changed by detecting or estimating the driving state of the vehicle and the state of the road surface. For example, during hard cornering, skidding, or the like, errors in horizontal directions (forward/backward position, and left/right position) are highly likely to increase. Accordingly, it is desirable to increase the upper and lower error limits of the three parameters.

The algorithm goes to step S15. Using an evaluation point projection method, the virtual image acquisition unit 11 creates a virtual image of a region near the vehicle for each of the virtual positions generated in step S14. It should be noted, however, that the purpose of the creation of a virtual image in step S15 is to estimate the position of the vehicle 1. Accordingly, of three-dimensional position information such as edges stored in the three-dimensional map database 3, only information on the region near the vehicle 1 is converted to a virtual image captured from a virtual position at a virtual attitude angle, using an evaluation point projection method. In this embodiment, only three-dimensional position information such as edges located at or within three meters from each virtual position is projected to create a virtual image. It should be noted that the virtual attitude angle to be used in step S15 may be the attitude angle of the vehicle estimated in step S19 in the previous execution of the loop or the initially-estimated attitude angle found in step S13.

The algorithm goes to step S16. The likelihood setting unit 12 compares each of the virtual images in a region near the vehicle created in step S15 with the captured image. Specifically, for each of the virtual images created in step S15, the likelihood setting unit 12 compares respective edge images generated from edges contained in the virtual image and edges contained in the captured image, and calculates the degree of matching between edges in the virtual image and edges in the edge image. For example, the likelihood setting unit 12 counts as the degree of matching the number of pixels at which edges in the virtual image of a region near the vehicle match edges in the edge image, i.e., the number of pixels at which edges on the edge image are located at the pixel coordinate positions of edges on the virtual image. Further, the likelihood setting unit 12 assigns a higher position likelihood to the virtual image as the degree of matching between edges in the virtual image and edges in the captured image increases.

Subsequently, the moving-object position/attitude estimation unit 13 estimates the position of the vehicle based on the virtual position of the virtual image assigned a high position likelihood by the likelihood setting unit 12. For example, the moving-object position/attitude estimation unit 13 calculates the virtual position of the virtual image having the greatest number of matching pixels among the plural virtual images created in step S15, as the actual position of the vehicle 1; or the moving-object position/attitude estimation unit 13 may weight each of the virtual positions according to the position likelihood of the virtual image and calculate the average value of the weighted virtual positions as the actual position of the vehicle.

As described above, through the processing from step S14 to step S16, virtual images of a region near the vehicle based on plural virtual positions can be acquired, and the position of the vehicle can be estimated using the virtual images of the region near the vehicle.

Next, the algorithm goes to step S17. The virtual image acquisition unit 11 references the initially-estimated attitude angle calculated in step S13 and generates plural virtual attitude angles. At this time, the virtual image acquisition unit 11 generates plural virtual attitude angles which have values possible for the true value of the attitude angle of the vehicle, taking account of odometry errors induced by measurement errors and communication delays of the vehicle sensor group 4 and dynamic characteristics of the vehicle which cannot be taken into account in odometry. The virtual attitude angles are generated at intervals of a predetermined distance within the respective ranges between upper and lower error limits set for the parameters of three degrees of freedom which describe the attitude angle. In this embodiment, the upper and lower error limits of the parameters of three degrees of freedom which describe the attitude angle are set to ±0.5 [deg], ±0.5 [deg], and ±0.5 [deg] in the order of roll, pitch, and yaw, and virtual attitude angles are generated at intervals of 0.05 [deg]. Accordingly, 20×20×20=8000 virtual positions are generated. Similar to the case of the position in step S14, it is desirable that the upper and lower error limits and the intervals of the predetermined distance be appropriately changed by detecting or estimating the driving state of the vehicle and the state of the road surface. For example, during hard cornering, skidding, or the like, errors in yaw angle are highly likely to increase. Accordingly, the upper and lower error limits of the yaw angle are increased. Alternatively, during climbing over a step or the like, it is preferable to increase the upper and lower error limits of the pitch angle.

The algorithm goes to step S18. Using the evaluation point projection method, the virtual image acquisition unit 11 creates a virtual image of a region distant from the vehicle for each of the virtual attitude angles generated in step S17. It should be noted, however, that the purpose of the creation of a virtual image in step S18 is to estimate the attitude angle of the vehicle 1. Accordingly, of three-dimensional position information such as edges stored in the three-dimensional map database 3, only information on a portion distant from the vehicle 1 is converted to a virtual image captured from a virtual position at a virtual attitude angle, using an evaluation point projection method. In this embodiment, only three-dimensional position information such as edges located at or beyond 20 meters away from the initially-estimated position calculated in step S13 or the position of the vehicle 1 calculated in step S16 is projected to create a virtual image. It should be noted that the virtual position to be used in step S18 may be the position of the vehicle estimated in step S19 in the previous execution of the loop or the initially-estimated position found in step S13. It should be noted that if even extremely distant positions are projected, processing for projection takes a long time, and the resolution of the camera 2 is insufficient to distinguish whether or not edges match each other. Accordingly, in this embodiment, three-dimensional position information such as edges located at or beyond 50 meters away is not projected.

The algorithm goes to step S19. The likelihood setting unit 12 compares each of the virtual images in a region distant from the vehicle created in step S18 with the captured image. Specifically, for each of the virtual images created in step S18, the likelihood setting unit 12 compares respective edge images generated from edges contained in the virtual image and edges contained in the captured image, and calculates the degree of matching between edges in the virtual image and edges in the edge image. For example, the likelihood setting unit 12 counts as the degree of matching the number of pixels at which edges in the virtual image in a region distant from the vehicle match edges in the edge image, i.e., the number of pixels at which edges on the edge image are located at the pixel coordinate positions of edges on the virtual image. Further, the likelihood setting unit 12 assigns a higher attitude angle likelihood to the virtual image as the degree of matching between edges in the virtual image and edges in the captured image increases.

Subsequently, the moving-object position/attitude estimation unit 13 estimates the attitude angle of the vehicle based on the virtual attitude angle of the virtual image assigned a high attitude angle likelihood by the likelihood setting unit 12. For example, the moving-object position/attitude estimation unit 13 calculates the virtual attitude angle of the virtual image having the greatest number of matching pixels among the plural virtual images created in step S18, as the actual attitude angle of the vehicle 1; or the moving-object position/attitude estimation unit 13 may weight each of the virtual attitude angles according to the attitude angle likelihood of the virtual image and calculate the average value of the weighted virtual attitude angles as the actual attitude angle of the vehicle.

As described above, through the processing from step S17 to step S19, virtual images of a region distant from the vehicle based on plural virtual attitude angles can be acquired, and the attitude angle of the vehicle can be estimated using the virtual images of the region distant from the vehicle.

The ECU 1 can calculate the position and the attitude angle of the vehicle in real time by repeating the processing from step S1 to step S19 such as described above.

As described above, in this embodiment, the position and the attitude angle of the vehicle are separately estimated using different virtual images. Specifically, virtual images of a region near the vehicle based on plural virtual positions are acquired, and the position of the vehicle is estimated using the virtual images of the region near the vehicle. Further, virtual images of a region distant from the vehicle based on plural virtual attitude angles are acquired, and the attitude angle of the vehicle is estimated using the virtual images of the region distant from the vehicle. This makes it possible to assign different likelihoods to the position and the attitude angle, and separately adjust and estimate the position and the attitude angle depending on the distance to a place at which an actual video image matches a virtual image. Accordingly, the position and the attitude angle of a moving object can be accurately estimated.

Moreover, in the case where a pixel in the captured image and a pixel in the virtual image match each other at a more distant position located at or beyond a predetermined distance from the camera 2, the attitude angle likelihood of the virtual image may be set to a value increased at a lower rate or a predetermined upper limit. Thus, when the video image to be matched contains a portion extremely distant from the camera 2, the moving-object position/attitude estimation apparatus can prevent the attitude angle likelihood from being determined in accordance with the degree of matching in the distant portion. Thus, even when an edge extracted from a portion extremely distant from the camera 2 contains noise or error, the influence thereof can be reduced, and the error of estimation of the attitude angle can be reduced.

Further, in the case where a pixel in the captured image and a pixel in the virtual image match each other at a nearer position located at or within a predetermined distance from the camera 2, the position likelihood of the virtual image may be set to a value increased at a lower rate or a predetermined upper limit. This prevents a too high position likelihood from being assigned in the case where two video images match at a position located at or within the predetermined distance from the camera 2. Accordingly, in the moving-object position/attitude estimation apparatus, even when an edge extracted from a region extremely near the camera 2 contains noise or error, the influence thereof can be reduced, and the error of estimation of the position can be reduced.

While the present invention has been described in detail above with reference to embodiments, the present invention is not limited to those descriptions, but it is apparent to those skilled in the art that various changes and modifications can be made thereto.

In the above-described embodiments, a vehicle has been taken as an example. The present invention can also be applied to an aircraft, a ship, or the like as long as the moving object has at least one camera mounted thereon.

Moreover, in the above-described embodiments, the six-degree-of-freedom position (forward/backward position, left/right position, and vertical position) and attitude angle (roll, pitch, and yaw) of the vehicle are found. However, the present invention is not limited to this. For example, the embodiments can also be applied to the case where three-degree-of-freedom position (forward/backward position, and left/right position) and attitude angle (yaw) are estimated as in an automated guided vehicle for use in a factory or the like without suspensions or the like. Specifically, in such a vehicle, since the vertical position and the roll and pitch of the attitude angle are fixed parameters, these parameters may be measured in advance or found with reference to the three-dimensional map database 3.

It should be noted that in the first and second embodiments, the "virtual image acquisition unit 11 configured to acquire a virtual image by converting three-dimensional map data to an image captured from a virtual position at a virtual attitude angle" has been described as a "comparative image acquiring unit configured to acquire a comparative image viewed from a predetermined position at a predetermined attitude angle." However, the "comparative image acquiring unit" is not limited to this. For example, the comparative image acquiring unit may acquire as a comparative image a captured image captured in the past by the camera 2. In that case, the moving-object position/attitude estimation unit 13 can estimate the attitude angle of the vehicle based on the attitude angle possessed by the vehicle at the time of capturing a comparative image assigned a high attitude angle likelihood by the likelihood setting unit 12, and can estimate the position of the vehicle based on the position where the vehicle has been located at the time of capturing a comparative image assigned a high position likelihood by the likelihood setting unit 12. This makes it possible to assign different likelihoods to the position and the attitude angle, and separately adjust and estimate the position and the attitude angle depending on the distance to a place at which the currently captured video image matches the image (comparative image) captured in the past. Accordingly, the position and the attitude angle of a moving object can be accurately estimated.

In the moving-object position/attitude estimation apparatus and the moving-object position/attitude estimation methods according to the embodiments, a high attitude angle likelihood is assigned to a virtual image in the case where a captured image matches the virtual image at a distant position, and a high position likelihood is assigned to a virtual image in the case where a captured image matches the virtual image at a proximal position. Accordingly, an attitude angle likelihood can be assigned based on matching at a distant position where there is a large error in position, and a position likelihood can be assigned based on matching at a proximal position where there is a large error in attitude angle. Thus, the position and the attitude angle of a moving object can be accurately estimated. Accordingly, the present invention has an industrial applicability.

The invention claimed is:

1. A moving-object position/attitude estimation apparatus for estimating a position and an attitude angle of a moving object, comprising:
    an image-capturing circuitry configured to acquire a captured image by capturing an image of surroundings of the moving object;
    a comparative image acquiring circuitry configured to acquire a comparative image viewed from a predetermined position at a predetermined attitude angle;
    a likelihood setting circuitry configured to compare the captured image acquired by the image-capturing circuitry with the comparative image acquired by the comparative image acquiring circuitry and set a higher position likelihood or a higher attitude angle likelihood as a number of pixels at which edges on an edge image calculated from the captured image are located at pixel coordinate positions of edges on the comparative image increases, and to assign a high attitude angle likelihood to the comparative image in a case where a distant-position pixel in the captured image matches a distant-position pixel in the comparative image and assign a high position likelihood to the comparative image in a case where a proximal-position pixel in the captured image matches a proximal-position pixel in the comparative image; and
    a moving-object position/attitude estimation circuitry configured to estimate the attitude angle of the moving object based on the attitude angle of the comparative image assigned the high attitude angle likelihood by the likelihood setting circuitry and estimate the position of the moving object based on the position of the comparative image assigned the high position likelihood by the likelihood setting circuitry.

2. The moving-object position/attitude estimation apparatus according to claim 1, wherein
    the comparative image acquiring circuitry is a virtual image acquisition circuitry configured to acquire a virtual image by converting three-dimensional map data to an image captured from a virtual position at a virtual attitude angle,
    the likelihood setting circuitry compares the captured image acquired by the image-capturing circuitry with the virtual image acquired by the virtual image acquisition circuitry and sets the higher position likelihood or the higher attitude angle likelihood as the number of pixels at which edges on the edge image calculated from the captured image are located at pixel coordinate positions of edges on the virtual image increases, assigns a high attitude angle likelihood to the virtual image in a case where a distant-position pixel in the captured image matches a distant-position pixel in the virtual image, and assigns a high position likelihood to the virtual image in a case where a proximal-position pixel in the captured image matches a proximal-position pixel in the virtual image, and
    the moving-object position/attitude estimation circuitry estimates the attitude angle of the moving object based on the virtual attitude angle of the virtual image assigned the high attitude angle likelihood by the likelihood setting circuitry, and estimates the position of the moving object based on the virtual position of the virtual image assigned the high position likelihood by the likelihood setting circuitry.

3. The moving-object position/attitude estimation apparatus according to claim 1, wherein
the comparative image acquiring circuitry acquires as the comparative image the captured image captured in the past by the image-capturing circuitry, and
the moving-object position/attitude estimation circuitry estimates the attitude angle of the moving object based on an attitude angle at which the moving object was when the comparative image assigned the high attitude angle likelihood by the likelihood setting circuitry was captured, and estimates the position of the moving object based on a position where the moving object was located when the comparative image assigned the high position likelihood by the likelihood setting circuitry was captured.

4. The moving-object position/attitude estimation apparatus according to claim 1, wherein in a case where among distant-position pixels in the captured image and the comparative image, a pixel in the captured image and a pixel in the comparative image match each other at a more distant position located at or beyond a predetermined distance from the moving object, the likelihood setting circuitry sets the attitude angle likelihood of the comparative image such that the likelihood is set to a predetermined upper limit.

5. The moving-object position/attitude estimation apparatus according to claim 1, wherein in a case where among proximal-position pixels in the captured image and the comparative image, a pixel in the captured image and a pixel in the comparative image match each other at a nearer position located at or within a predetermined distance from the moving object, the likelihood setting circuitry sets the position likelihood of the comparative image such that the likelihood is set to a predetermined upper limit.

6. The moving-object position/attitude estimation apparatus according to claim 2, wherein
the virtual image acquisition circuitry generates plural candidate points each set to have a virtual position and a virtual attitude angle and acquires a virtual image for each of the candidate points;
the likelihood setting circuitry compares each of the virtual images with the captured image and assigns an attitude angle likelihood and a position likelihood; and
the moving-object position/attitude estimation circuitry estimates the attitude angle of the moving object based on the attitude angle likelihoods of the virtual images and estimates the position of the moving object based on the position likelihoods of the virtual images, and
the virtual image acquisition circuitry performs resampling of the plural candidate points based on the attitude angle likelihoods of the virtual images and the position likelihoods of the virtual images.

7. The moving-object position/attitude estimation apparatus according to claim 1, wherein
the comparative image acquiring circuitry sets plural positions and acquires the comparative image of a region located at or within a predetermined distance from the moving object for each of the positions,
the likelihood setting circuitry compares each of the comparative images of the region located at or within the predetermined distance from the moving object with the captured image and assigns a higher position likelihood to the comparative image as the number of pixels at which edges on the edge image calculated from the captured image are located at pixel coordinate positions of edges on the comparative image increases,
the moving-object position/attitude estimation circuitry estimates the position of the moving object based on the position of the comparative image assigned the higher position likelihood by the likelihood setting circuitry,
the comparative image acquiring circuitry sets plural attitude angles and acquires the comparative image of a region located at or beyond a predetermined distance away from the moving object for each of the attitude angles,
the likelihood setting circuitry compares each of the comparative images of the region located at or beyond the predetermined distance away from the moving object with the captured image and assigns a higher attitude angle likelihood to the comparative image as the number of pixels at which edges on the edge image calculated from the captured image are located at the pixel coordinate positions of edges on the comparative image increases, and
the moving-object position/attitude estimation circuitry estimates the attitude angle of the moving object based on the attitude angle of the comparative image assigned the higher attitude angle likelihood by the likelihood setting circuitry.

8. A moving-object position/attitude estimation method for estimating a position and an attitude angle of a moving object, comprising:
comparing a captured image obtained by capturing an image of surroundings of the moving object with a comparative image viewed from a predetermined position at a predetermined attitude angle and setting a higher position likelihood or a higher attitude angle likelihood as a number of pixels at which edges on an edge image calculated from the captured image are located at pixel coordinate positions of edges on the comparative image increases;
assigning a high attitude angle likelihood to the comparative image in a case where a distant-position pixel in the captured image matches a distant-position pixel in the comparative image and assigning a high position likelihood to the comparative image in a case where a proximal-position pixel in the captured image matches a proximal-position pixel in the comparative image; and
estimating the attitude angle of the moving object based on the attitude angle of the comparative image assigned the high attitude angle likelihood and estimating the position of the moving object based on the position of the comparative image assigned the high position likelihood.

* * * * *